United States Patent
Wu et al.

(10) Patent No.: US 9,658,984 B2
(45) Date of Patent: May 23, 2017

(54) METHOD AND APPARATUS FOR SYNCHRONIZING MULTIPLE MAC TABLES ACROSS MULTIPLE FORWARDING PIPELINES

(71) Applicant: Cisco Technology, Inc., San Jose, CA (US)

(72) Inventors: Wanli Wu, Sunnyvale, CA (US); Saikat Bhattacharya, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 121 days.

(21) Appl. No.: 14/331,971

(22) Filed: Jul. 15, 2014

(65) Prior Publication Data

US 2016/0020992 A1    Jan. 21, 2016

(51) Int. Cl.
*G06F 13/00* (2006.01)
*G06F 15/167* (2006.01)
*H04L 12/935* (2013.01)

(52) U.S. Cl.
CPC ........ *G06F 15/167* (2013.01); *H04L 49/3009* (2013.01)

(58) Field of Classification Search
CPC .............. H04L 29/08549; H04L 29/06; H04L 29/08072; H04L 49/90; H04L 47/10; H04L 47/215; H04L 47/20; H04L 47/32; H04L 12/5602; G06F 13/28; G06F 15/167

USPC ....................... 370/235.1; 709/212
See application file for complete search history.

(56) References Cited

U.S. PATENT DOCUMENTS

| | | | |
|---|---|---|---|
| 7,415,022 B2 | 8/2008 | Kadambi et al. | |
| 7,929,545 B2 | 4/2011 | Martinotti et al. | |
| 8,089,967 B2 | 1/2012 | Hazard | |
| 2013/0194964 A1 | 8/2013 | Basso et al. | |
| 2014/0064091 A1* | 3/2014 | Basso ................... | H04L 45/742 370/235.1 |

* cited by examiner

*Primary Examiner* — Robert B Harrell
(74) *Attorney, Agent, or Firm* — Patterson + Sheridan LLP

(57) ABSTRACT

Embodiments provide techniques for synchronizing forwarding tables across forwarding pipelines. One embodiment includes receiving, in a network switch comprising a plurality of forwarding pipelines, a plurality of data packets. Each of the plurality of data packets corresponds to a respective one of the plurality of forwarding pipelines. Each of the plurality of forwarding pipelines maintains a respective forwarding table corresponding to a respective plurality of ports managed by the forwarding pipeline. A plurality of update operations to be performed on the forwarding tables are determined, based on the received plurality of data packets. Embodiments further include performing the plurality of update operations on the forwarding tables, such that the forwarding tables across all forwarding pipelines of the plurality of forwarding pipelines are synchronized.

17 Claims, 8 Drawing Sheets

METHOD AND APPARATUS FOR SYNCHRONIZING MULTIPLE MAC TABLES ACROSS MULTIPLE FORWARDING PIPELINES

TECHNICAL FIELD

Embodiments presented in this disclosure generally relate to computer networking, and more specifically to synchronizing forwarding tables across forwarding pipelines.

BACKGROUND

Data communication in a computer network involves the exchange of data between two or more entities interconnected by communication links and subnetworks. A local area network (LAN) is an example of a subnetwork that provides relatively short-distance communication among the interconnected stations. In contrast, a wide area network (WAN) facilitates long-distance communication over links provided by public or private telecommunications facilities. The entities are typically software programs executing on hardware computer platforms which, depending on their roles within the network, may serve as end stations or intermediate stations. Examples of intermediate stations include routers, bridges and switches that interconnect communication links and subnetworks, whereas an end station may be a computer located on one of the subnetworks. More generally, an end station connotes a source of or target for data that typically does not provide routing or other services to other computers on the network.

End stations typically communicate by exchanging discrete packets or frames of data according to predefined protocols. In this context, a protocol represents a set of rules defining how the stations interact with each other to transfer data. The traffic flowing into a network device—e.g., a router, switch, bridge, server, and the like—is generally made up of multiple abstraction layers (e.g., the Open Systems Interconnection (OSI) model). Each of these logical layers generally relates to communications functions of a similar nature. For instance, layer 2 of the OSI model is known as the data link layer and uses physical addressing (e.g., Media Access Control (MAC) addresses) for switching traffic. Layer 2 encapsulation generally provides the mechanism for transferring data between network entities, and can also be used for error correction for layer 1. As another example, layer 3 traffic is known as network layer traffic and uses logical addressing (e.g., Internet Protocol (IP) addresses) for routing traffic. Layer 3 encapsulation generally provides the mechanism for transmitting data between a source host on a first network to a destination host located on a second network.

Distributed switching solutions are becoming increasingly popular as a cost-effective way to increase switch performance and capabilities. In distributed switching systems, individual switching entities can perform information forwarding, learning, and aging out of forwarding entries. For example, a switching entity containing multiple switching subunits can be configured such that each switching subunit maintains its own forwarding table (also referred to herein as a media access control (MAC) table) in which information about network addresses is stored. Additionally, switching functionalities such as information forwarding, learning, and aging out of forwarding entries can be performed on a per-switching subunit basis, with each switching subunit performing actions to maintain its own respective forwarding table. As such, each switching subunit is typically configured with the logic needed to use and maintain such a forwarding table.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Figure 1:
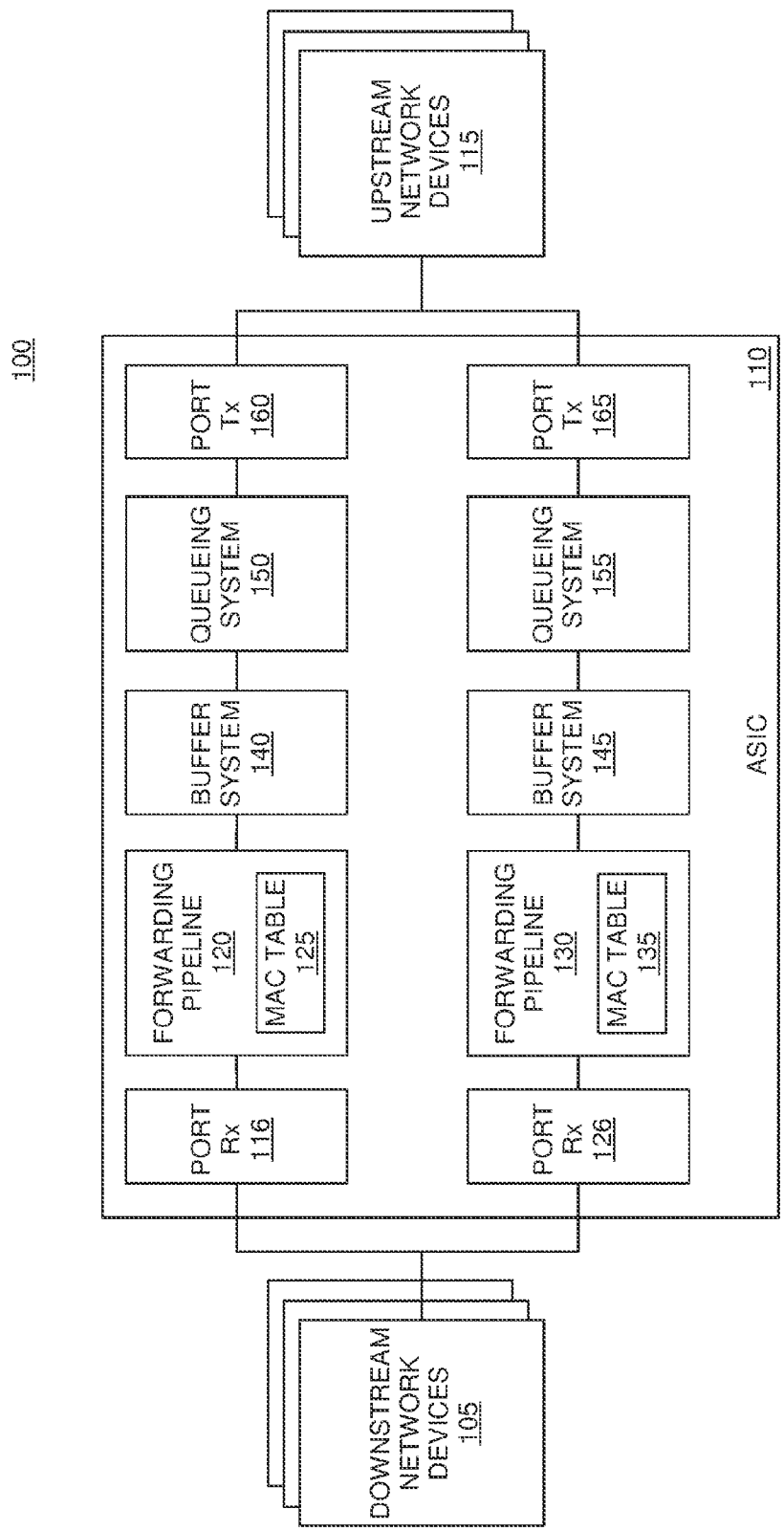
FIG. 1 illustrates a system that includes an application-specific integrated circuit (ASIC) connected to a network, according to one embodiment described herein.

One embodiment provides a method for synchronizing forwarding tables across forwarding pipelines. The method includes receiving, in a network switch comprising a plurality of forwarding pipelines, a plurality of data packets. Each of the plurality of data packets corresponds to a respective one of the plurality of forwarding pipelines, and each of the plurality of forwarding pipelines maintains a respective forwarding table corresponding to a respective plurality of ports managed by the forwarding pipeline. The method further includes determining a plurality of update operations to be performed on the forwarding tables, based on the received plurality of data packets. Additionally, the method includes performing the plurality of update operations on the forwarding tables, such that the forwarding tables across all forwarding pipelines of the plurality of forwarding pipelines are synchronized.

Particular other embodiments provide a network switch and an integrated circuit capable of carrying out the aforementioned method.

Example Embodiments

While distributed network switches offer numerous advantages, such switches can present additional challenges as well. For example, for switching units implemented as an application-specific integrated circuit (ASIC), hardware limitations (e.g., bandwidth limitations) and cost considerations can restrict how many ports a given switching subunit can manage. In order to overcome these limitations, multiple switching subunits (also referred to herein as forwarding pipelines) within the ASIC can be used, with each switching subunit managing a portion of the ports. For example, a network switch implemented as an ASIC with 96 ports could employ two forwarding pipelines, with each forwarding pipeline managing a respective 48 of the 96 ports. Thus, each of the forwarding pipelines could store and maintain a respective forwarding table (also referred to herein as a media access control (MAC) table) for use in forwarding data packets across the managed ports.

One consequence to maintaining separate forwarding tables on each of the forwarding pipelines is that data in the forwarding table of one of the forwarding pipelines cannot be shared with the other forwarding pipelines. For example, a first forwarding pipeline could be configured to manage the lower 48 ports of an ASIC and a second forwarding pipeline could be configured to manage the higher 48 ports of the ASIC. In such an example, each forwarding pipeline could maintain its own MAC table for providing read bandwidth for MAC source look up (e.g., for learning and refreshing entries in the MAC table) and MAC destination look up (e.g., for bridging operations). Thus, each of the forwarding pipelines in this example could operate independently on their assigned ports using their own independent MAC table.

However, when the forwarding pipelines operate completely independently of one other, the forwarding pipelines are unable to use data learned by the other forwarding pipeline. As such, the forwarding pipelines may perform duplicate learning and refresh operations, due to their inability to access the forwarding information on the other forwarding pipeline. For example, a first forwarding pipeline could access its own MAC table to search for data pertaining to a particular MAC address and could determine that the MAC table does not contain any such data (i.e., a cache miss). The first forwarding pipeline could then begin the process of learning the data and updating its own MAC table. However, the requested data could be present in the MAC table of the second forwarding pipeline on the ASIC throughout this process.

As such, embodiments provide techniques for synchronizing MAC tables such that the MAC tables behave as a single logical MAC table, so that any MAC learning and refresh operations occurring on one of the forwarding pipelines can be used for forwarding traffic on all of the forwarding pipelines. That is, in the above example, MAC learning and refresh operations performed based on data packets from the lower 48 ports of the ASIC can be used for forwarding traffic on the higher 48 ports of the ASIC, and vice versa.

Embodiments include receiving, in a network switch comprising a plurality of forwarding pipelines, a plurality of data packets. Here, each of the plurality of data packets corresponds to a port managed by a respective one of the plurality of forwarding pipelines. For example, a data packet received on one of the lower 48 ports of the ASIC can be said to correspond to the first forwarding pipeline managing the lower 48 ports. Additionally, each of the plurality of forwarding pipelines maintains a respective forwarding table corresponding to a respective plurality of ports managed by the forwarding pipeline. Thus, both the first forwarding pipeline and the second forwarding pipeline can include memory that stores a MAC table for use in forwarding data packets on the ports managed by the respective forwarding pipeline. In one embodiment, the MAC table is stored in memory using a 4×4 D-left hash table. More generally, however, it is broadly contemplated that any technique for storing such data can be used, consistent with the functionality described herein.

Logic on the network switch could then determine a plurality of update operations for the forwarding tables on the plurality of forwarding pipelines, based on the received plurality of data packets. Examples of such operations include, without limitation, a MAC source address (SA) lookup miss and new learn operation in which a new entry is written back to an empty entry in the MAC table and a hit and update operation in which updated information is written back to an existing entry in the MAC table. Once the operations are determined, the logic can perform the plurality of update operations on each of the plurality of forwarding pipelines. Thus, by performing the update operations on all of the forwarding pipelines, embodiments provide a single logical MAC table for use by each of the plurality of forwarding pipelines, thereby allowing information (e.g., MAC source and destination look-up operations) to be shared between the forwarding pipelines.

FIG. 1 illustrates a system that includes an application-specific integrated circuit (ASIC) connected to a network, according to one embodiment described herein. As shown, the system 100 includes an ASIC 110 connected to both downstream network devices 105 and upstream network devices 115. For example, the upstream 115 and downstream network devices 105 can represent host devices, network devices and the like. The ASIC 110 includes multiple pipelines, with a first pipeline including a port receiver unit 116, a forwarding pipeline 120, a buffer system 140, a queuing system 150 and a port transmission unit 160, and the second pipeline including a port receiver unit 126, forwarding pipeline 130, buffer system 145, queuing system 155 and port transmission unit 165. Generally, the port receiver units 116 and 126 manage the receipt of data from the downstream network devices 105 on one or more ports of the ASIC 110. Likewise, the port transmission units 160 and 165 managed the transmission of data from the ASIC 110 to the upstream network devices 115, using one or more ports of the ASIC 110. The buffer systems 140 and 145 are generally configured to perform buffering operations for data packets on the ASIC 110. The queuing systems 150 and 155 are generally configured to provide queues for outgoing data packets from the ASIC 110. The forwarding pipelines 120 and 130 each contain a respective MAC table 125 and 135.

Generally, each of the forwarding pipelines 120 and 130 can be configured to manage a respective portion of ports (not shown) on the ASIC 110. Thus, for example, if there are 96 ports on the ASIC 110, the forwarding pipeline 120 could be assigned to manage ports 1 through 48 and the forwarding pipeline 130 could be assigned to manage ports 49 through 96. A MAC table management component (e.g., MAC table management component 150, shown in FIG. 2) can be configured to manage updates to the MAC tables 125 and 135, such that the MAC tables 125 and 135 behave as a single logical MAC table for the ASIC 110. For example, when a MAC table update is needed because of a data packet is received on a port managed by the forwarding pipeline 120 (e.g., a miss and new learn operation, or a hit and update operation), the MAC table management component 150 could perform the needed MAC table update (or could cause the MAC table update to be performed by, e.g., logic on each of the forwarding pipelines 120 and 130) for both of the MAC tables 125 and 135, so that the MAC tables 125 and 135 remain synchronized with one another. Doing so ensures that the forwarding pipeline 120 can take advantage of MAC table entries created or updated based on a data packet received on a port 140 managed by the forwarding pipeline 130, and vice versa.

In one embodiment, the MAC tables 125 and 135 are maintained as a D-left hash data structure (e.g., a 4×4 D-left hash table) in a memory of the forwarding pipelines 120 and 130. Generally, D-left hashing is a hashing technique that involves splitting the hash table into d equal sections and specifying d unique hash values in the hash key. The d unique hash values can then be used to select a bucket within the equal sections of the hash table, placing the key-value pair within the least loaded bucket. Furthermore, the sections of the hash tables can be ordered in a left to right ordering, with ties being broken by selecting the left-most section. Choosing the least-loaded bucket provides a substantial theoretical advantage over hash tables having a single hash function (i.e., where d=1) and giving a preference to the left-most section (as opposed to settling ties via a random selection) provides a further performance advantage.

Figure 2:
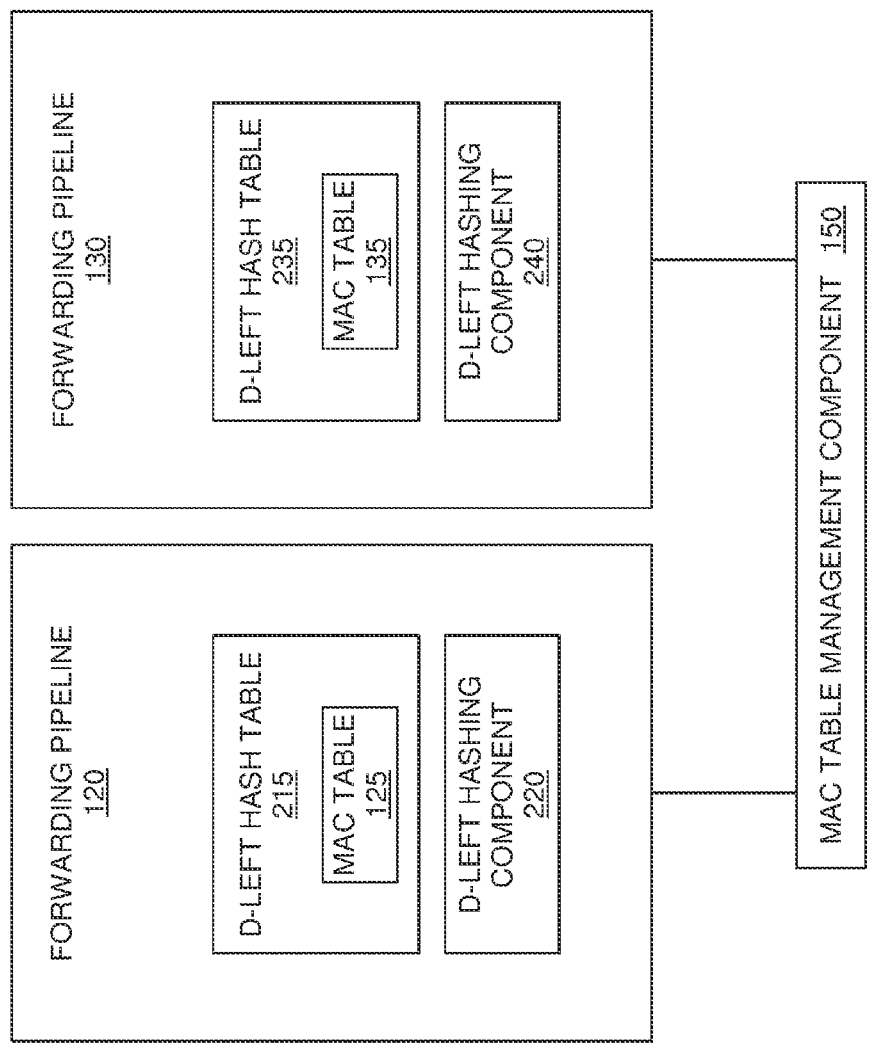
FIG. 2 illustrates a system that includes two forwarding pipelines and a media access control (MAC) table management component, according to one embodiment described herein.

In one embodiment, the MAC table management component 150 is configured to optimize updates to the MAC tables, based on limitations of the memory storing the MAC tables. That is, the MAC tables could be stored in memory capable of only performing one write per clock cycle, and the MAC table management component 150 could be configured to logic to select which of multiple write operations should be performed on a current clock cycle. FIG. 2 illustrates a system that includes two forwarding pipelines and a media access control (MAC) table management component, according to one embodiment described herein. As shown, the system 200 includes forwarding pipelines 120 and 130 communicatively coupled to a MAC table management component 150. For example, the forwarding pipelines 120 and 130 and the MAC table management component 150 could be implemented on a single switching and routing ASIC having a plurality of ports. Each forwarding pipeline 120 and 130 contains a respective D-left hash table 215 and 235 and a respective D-left hashing component 220 and 240. The D-left hash tables 215 and 235 are each storing a respective MAC table 125 and 135.

Here, the memories 210 and 230 could be capable of 1 write operation per clock cycle (e.g., due to cost considerations). In such an embodiment, the MAC table management component 150 could, upon determining that multiple write operations need to be performed (i.e., due to update and/or new learn operations resulting from received data packets), select one of the multiple write operations to be performed on a current clock cycle. The unselected write operations could be, for example, written to a write cache for execution on a subsequent clock cycle.

For example, the MAC table management component 150 could determine that a first update operation and a second update operation of the plurality of update operations need to be performed together in a single clock cycle, based on data packets received on each of the forwarding pipelines 120 and 130. For instance, both of the forwarding pipelines 120 and 130 could need to perform a miss and new learn operation for the MAC tables 125 and 135. The MAC table management component 150 could be configured to modify the standard D-left algorithm in order to avoid bank conflicts within the MAC tables 125 and 135. For instance, the MAC table management component 150 could generate two candidates for each of the data packets, with the first candidate selected based on the standard D-left hashing algorithm and the second candidate selected assuming that the first candidate has a bank conflict with the other forwarding pipeline. As an example, if the MAC table management component 150 determines that the total free entry in the chosen table is bigger than one, then the MAC table management component 150 could determine that the second candidate is the left most un-used entry in the second less table. In one embodiment, the MAC table management component 150 can be configured to select the second left most un-used entry in the first less table if it is available as the second candidate, and otherwise to select the left most un-used entry in the second less table. On the other hand, if the MAC table management component 150 determines that the total free entry in the chosen table is one, then the MAC table management component 150 could determine that the second candidate is the left most un-used entry in the second less table.

On the other hand, if the MAC table management component 150 determines that the first candidates for both data packets hit the same bank of the hash table, then the MAC table management component 150 selects one of the data packets to use the second candidate entry. For example, the MAC table management component 150 could first determine whether both the first packet and the second packet have only one entry left in the table. If so, the MAC table management component 150 could allow the first packet to take the first candidate and treat the second candidate as a bucket full. On the other hand, if the MAC table management component 150 determines that the first packet has only 1 entry while the second packet has more than 1 entry, the MAC table management component 150 could cause the first packet to use the first candidate entry and the second packet to use the second candidate entry.

In the event the MAC table management component 150 determines that the first packet has more than 1 entry while the second packet has only 1 entry, the MAC table management component 150 could cause the first packet to use the second candidate and the second packet to use the first candidate. Finally, for all other cases, the MAC table management component 150 could cause the first packet to use the first candidate and the second packet to use the second candidate. Of course, in the event that the first candidates for the data packets hit different banks, the MAC table management component 150 could determine that no conflict exists and could use the first candidate entries for both of the data packets.

Once the MAC table management component 150 determines which entries should be performed, the MAC table management component 150 performs the entries on the MAC tables 125 and 135 on each of the forwarding pipelines 120 and 130. By keeping the MAC tables 125 and 135 synchronized with each other, the MAC table management component 150 effectively provides a single logical MAC table for all of the forwarding pipelines 120 and 130. That is, the forwarding pipeline 120 can take advantage of information learned from data packets received on ports managed by the forwarding pipeline 130, and vice versa.

Figure 3:
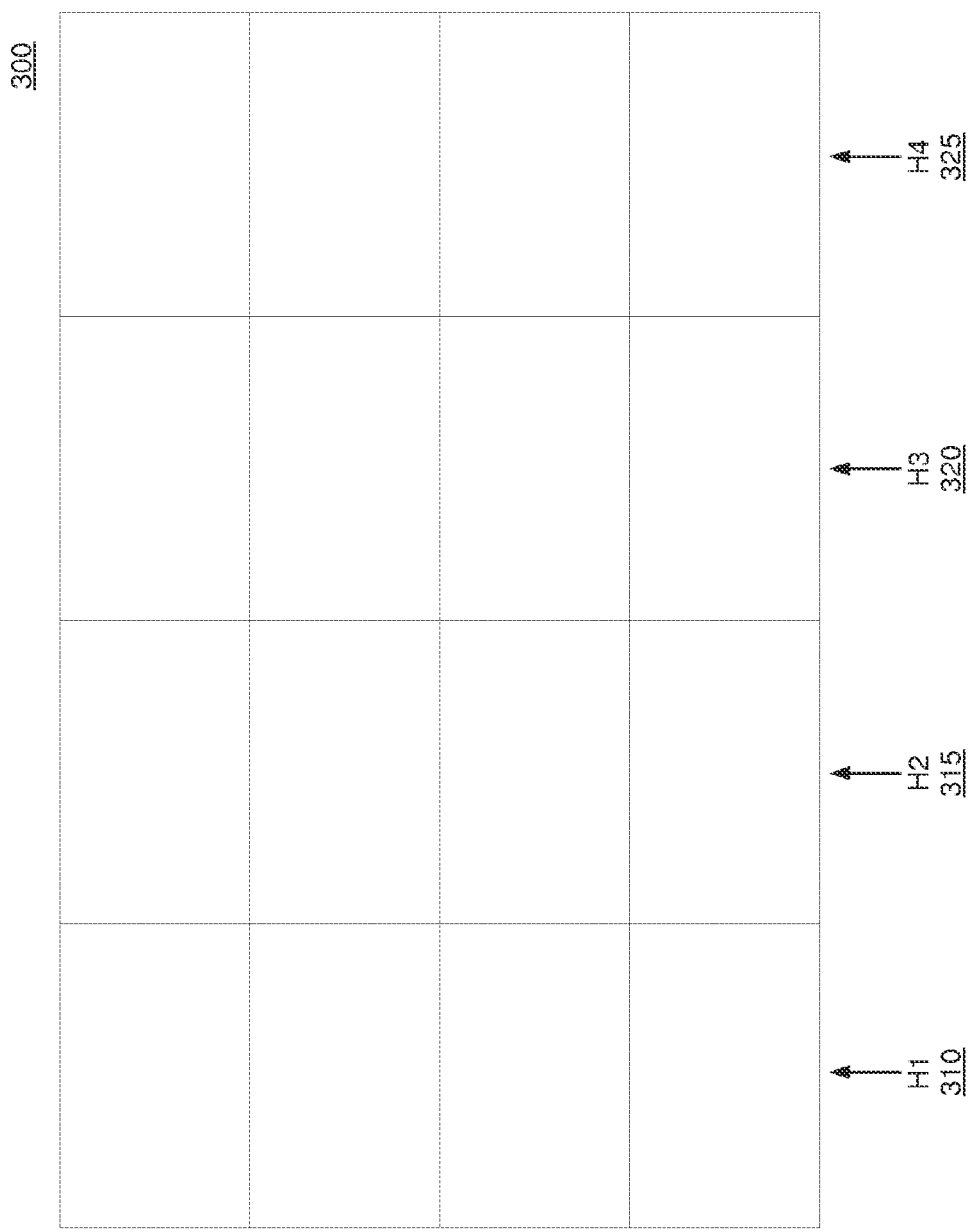
FIG. 3 illustrates a 4×4 D-left hash table, according to one embodiment described herein.

FIG. 3 illustrates a 4×4 D-left hash table, according to one embodiment described herein. As shown, the hash table 300 includes four separate subgroups, each with a corresponding hash function 310, 315, 320 and 325. Here, new entries could be hashed using each of the hash functions 310, 315, 320, and 325, and inserted into the subgroup having the fewest colliding keys based on the hash value determined using the respective hash function 310, 315, 320 and 325. As implied by the name D-left hashing, the subgroups could be arranged in a left to right ordering and ties between subgroups could be settled by selecting the left-most subgroup.

Figure 4:
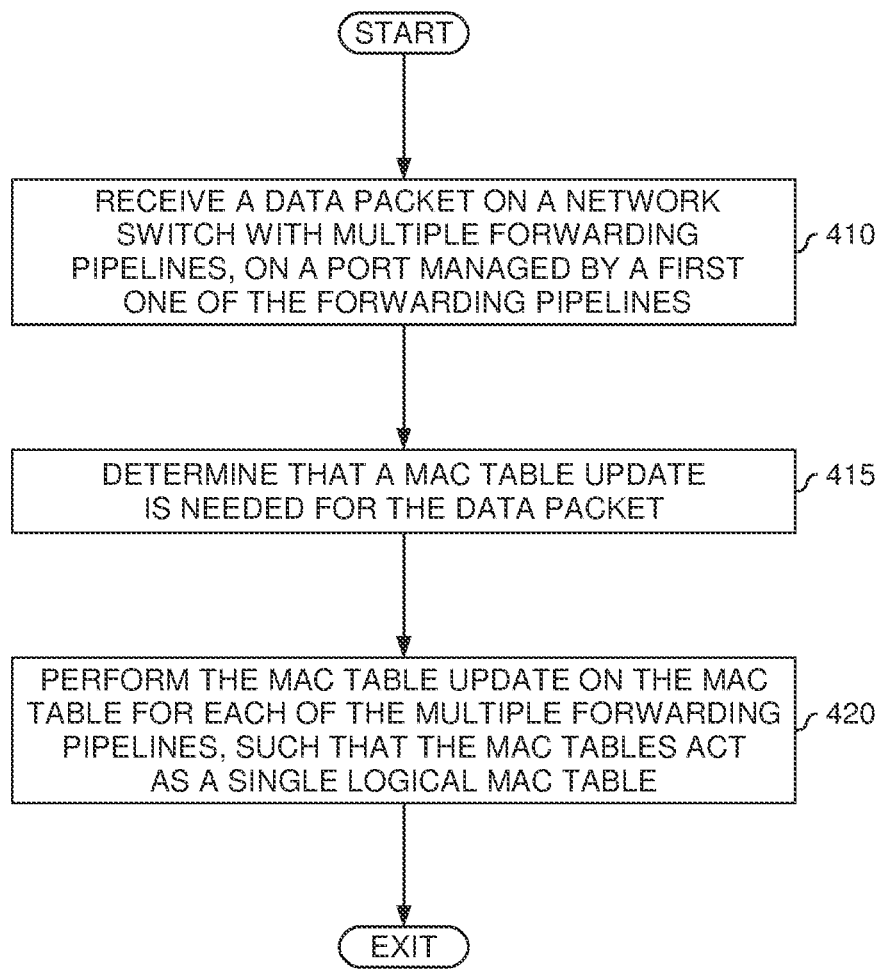
FIG. 4 is a flow diagram illustrating a method for synchronizing forwarding tables across multiple forwarding pipelines, according to one embodiment described herein.

FIG. 4 is a flow diagram illustrating a method for synchronizing forwarding tables across multiple forwarding pipelines, according to one embodiment described herein. As shown, the method 400 begins at block 410, where a network switch having a plurality of forwarding pipelines receives a data packet on a port assigned to one of the forwarding pipelines. The MAC table management component 150 then determines that a MAC table update is needed for the received data packet (block 415). For example, the MAC table management component 150 could access the MAC table on the forwarding pipeline the port is assigned to and could determine that no entry corresponding to a source MAC address of the data packet currently exists within the MAC table but that the source MAC address and port information should be written to an empty entry within the MAC table (i.e., a miss and learn operation).

The MAC table management component 150 then performs the MAC table update on each of the MAC tables for each of the forwarding pipelines of the network switch, such that the MAC tables act as a single logical MAC table for the network switch (block 420), and the method 400 ends. By synchronizing the individual MAC tables on each of the forwarding planes, the MAC table management component 150 allows information to be shared between the forwarding planes, thereby allowing the multiple forwarding planes to behave as a single logical switching device as opposed to multiple individual switching devices.

Figure 5:
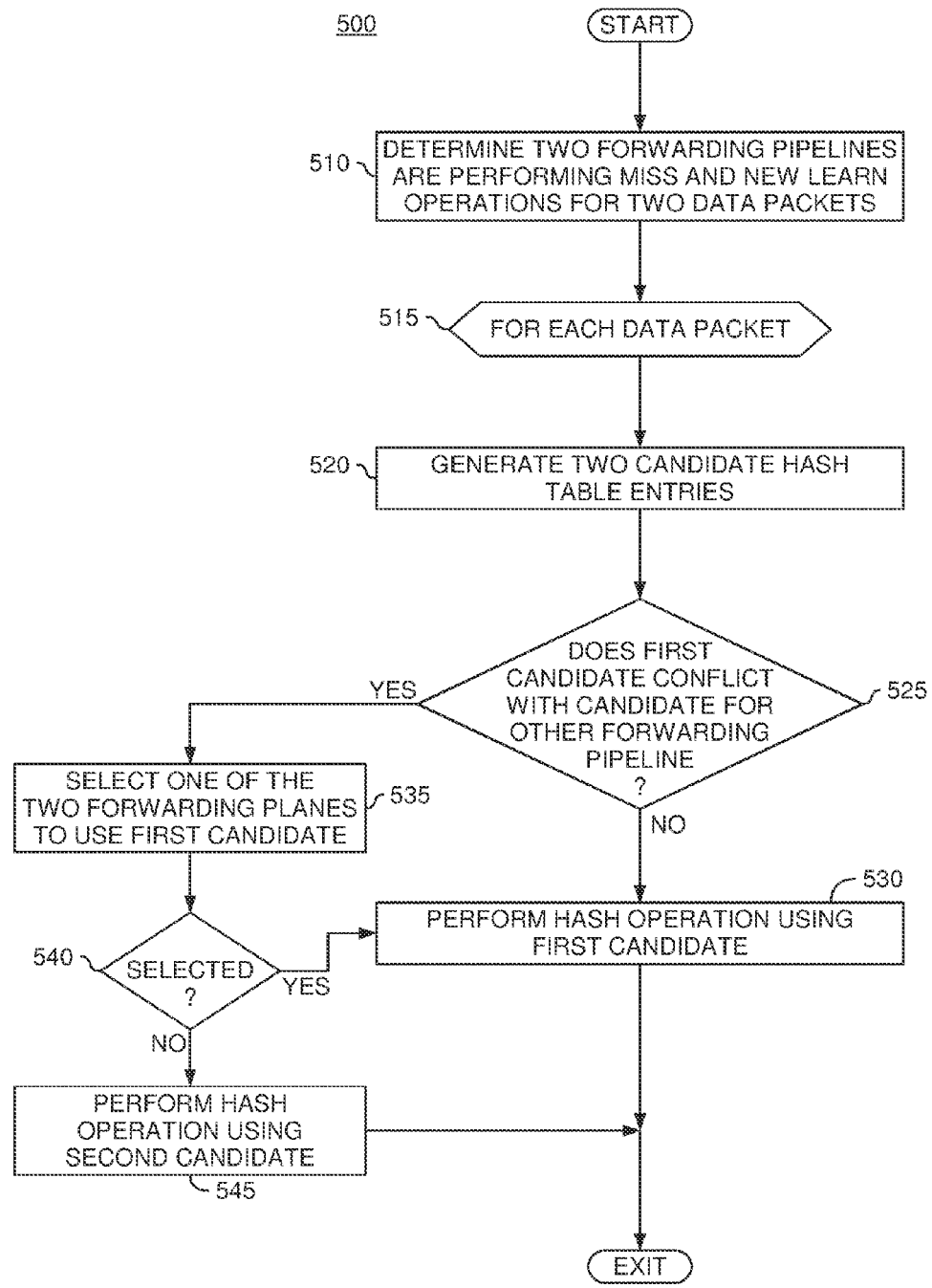
FIG. 5 is a flow diagram illustrating a method for synchronizing forwarding tables stored in 4×4 D-left hash table data structures across multiple forwarding pipelines, according to one embodiment described herein.

FIG. 5 is a flow diagram illustrating a method for synchronizing forwarding tables stored in 4×4 D-left hash table data structures across multiple forwarding pipelines, according to one embodiment described herein. As shown, the method 500 begins at block 510, where the MAC table management component 150 determines that two forwarding pipelines are performing miss and new learn operations based on receiving two data packets. The method 500 then, for each of the data packets (block 515), generates two candidate hash table entries (block 520). For instance, the MAC table management component 150 could be configured to modify the standard D-left algorithm in order to avoid bank conflicts within the MAC tables 125 and 135. The MAC table management component 150 could generate two candidates for each of the data packets, with the first candidate selected based on the standard D-left hashing algorithm and the second candidate selected assuming that the first candidate has a bank conflict with the other forwarding pipeline. As an example, if the MAC table management component 150 determines that the total free entry in the chosen table is bigger than one, then the MAC table management component 150 could determine that the second candidate is the second left most un-used entry in the first less table if it is available, and otherwise is the left most un-used entry in the second less table. On the other hand, if the MAC table management component 150 determines that the total free entry in the chosen table is one, then the MAC table management component 150 could determine that the second candidate is the left most un-used entry in the second less table.

The MAC table management component 150 then determines whether the first candidates for each of the data packets conflict with one another (block 525). That is, the MAC table management component 150 determines whether the first candidates refer to the same bank of the MAC tables maintained on each of the forwarding pipelines. If there is no conflict, the MAC table management component 150 performs the hash table operation for each of the data packets using the respective first candidate (block 530), and the method 500 ends.

In the event the MAC table management component 150 determines the first candidates conflict with one another, the MAC table management component 150 selects one of the two forwarding pipelines to use the first candidate (block 535). If the MAC table management component 150 determines the current forwarding pipeline was selected to perform the first candidate (block 540), the MAC table management component 150 performs the hash operation for the current forwarding pipeline using the first candidate (block 530) and the method 500 ends. If instead the MAC table management component 150 determines that the current forwarding pipeline was not selected, the MAC table management component 150 performs the hash operation for the current forwarding pipeline using the generated second candidate (block 545) and the method 500 ends.

For instance, the MAC table management component 150 could be configured with logic to determine that the first candidates conflict when the entries for both data packets hit the same bank of the hash table. In such a case, the MAC table management component 150 could select one of the data packets to use the second candidate entry. For example, the MAC table management component 150 could first determine whether both the first packet and the second packet have only one entry left in the table, and if so, the MAC table management component 150 could allow the first packet to take the first candidate and treat the second packet as a bucket full. In one embodiment, the MAC Table management component 150 can put an operation specifying the first candidate for the second packet into a cache to be written on subsequent cycles. If instead the MAC table management component 150 determines that the first packet has only 1 entry while the second packet has more than 1 entry, the MAC table management component 150 could cause the first packet to use the first candidate entry and the second packet to use the second candidate entry. In the event the MAC table management component 150 determines that the first packet has more than 1 entry while the second packet has only 1 entry, the MAC table management component 150 could cause the first packet to use the second candidate and the second packet to use the first candidate. Finally, for all other cases, the MAC table management component 150 could cause the first packet to use the first candidate and the second packet to use the second candidate.

Figure 6:
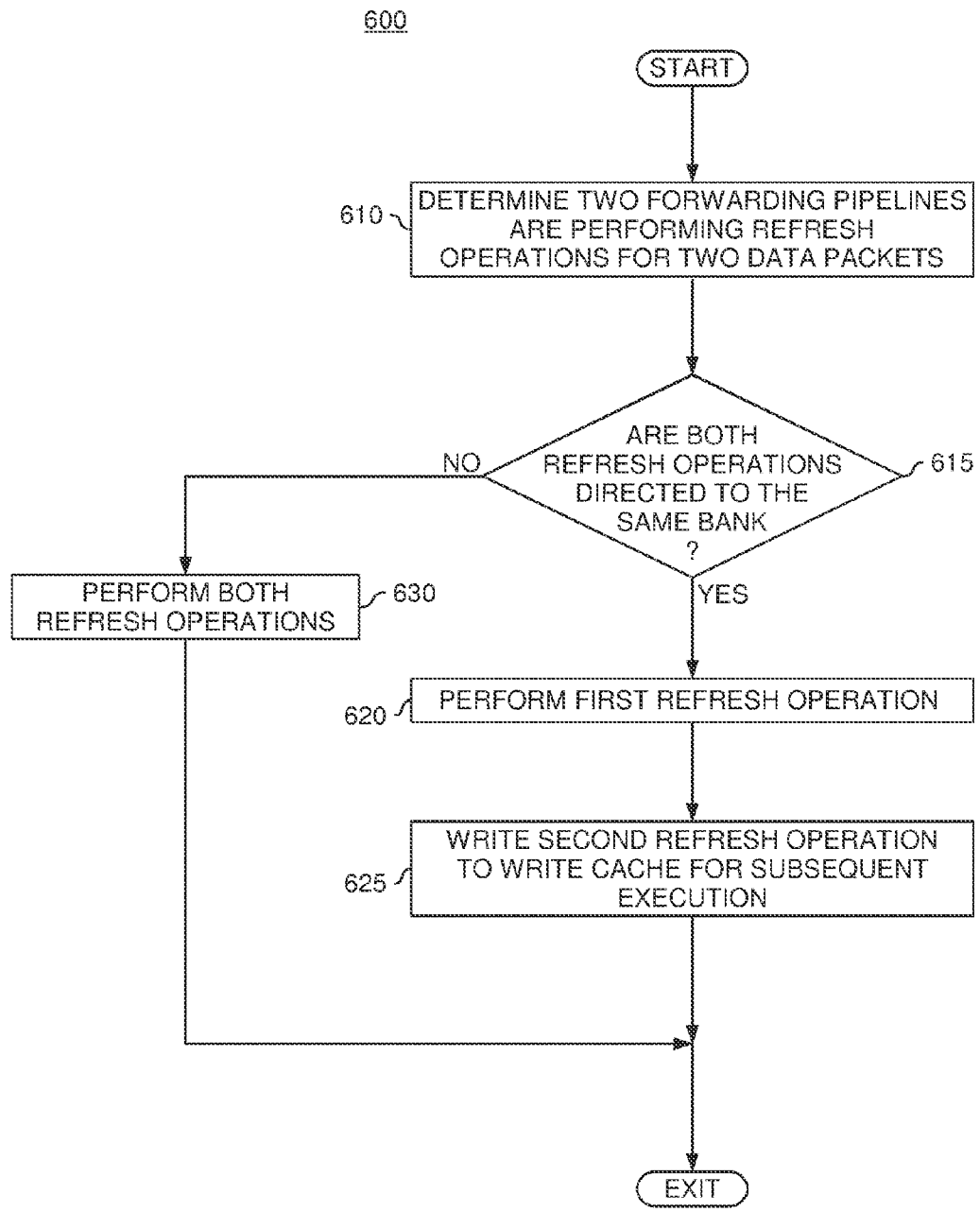
FIG. 6 is a flow diagram illustrating a method for synchronizing forwarding tables stored in 4×4 D-left hash table data structures across multiple forwarding pipelines, according to one embodiment described herein.

FIG. 6 is a flow diagram illustrating a method for synchronizing forwarding tables stored in 4×4 D-left hash table data structures across multiple forwarding pipelines, according to one embodiment described herein. As shown, the method 600 begins at block 610, where the MAC table management component 150 determines that two forwarding pipelines are performing refresh operations for two data packets. The MAC table management component 150 then determines whether both refresh operations are directed to the same bank of a D-left hash table (block 615). If not, the MAC table management component 150 determines that no conflict exists and performs both of the refresh operations (block 630), at which the method 600 ends.

If instead the MAC table management component 150 determines that both of the refresh operations are directed to the same bank of the hash table, the MAC table management component 150 could perform the first refresh operation for a first one of the forwarding pipelines (block 620) while writing the second refresh operation for the other forwarding pipeline to a write cache for subsequent execution (block 625), and the method 600 ends. That is, the MAC table management component 150 may be unable to perform both of the refresh operations in the same clock cycle, because the refresh operations both reference the same bank and the MAC tables are stored in a memory capable of only a single write operation per clock cycle. As such, the MAC table management component 150 could select the first refresh operation to be performed on the current cycle and could cache the second refresh operation to be executed on a subsequent clock cycle.

Figure 7:
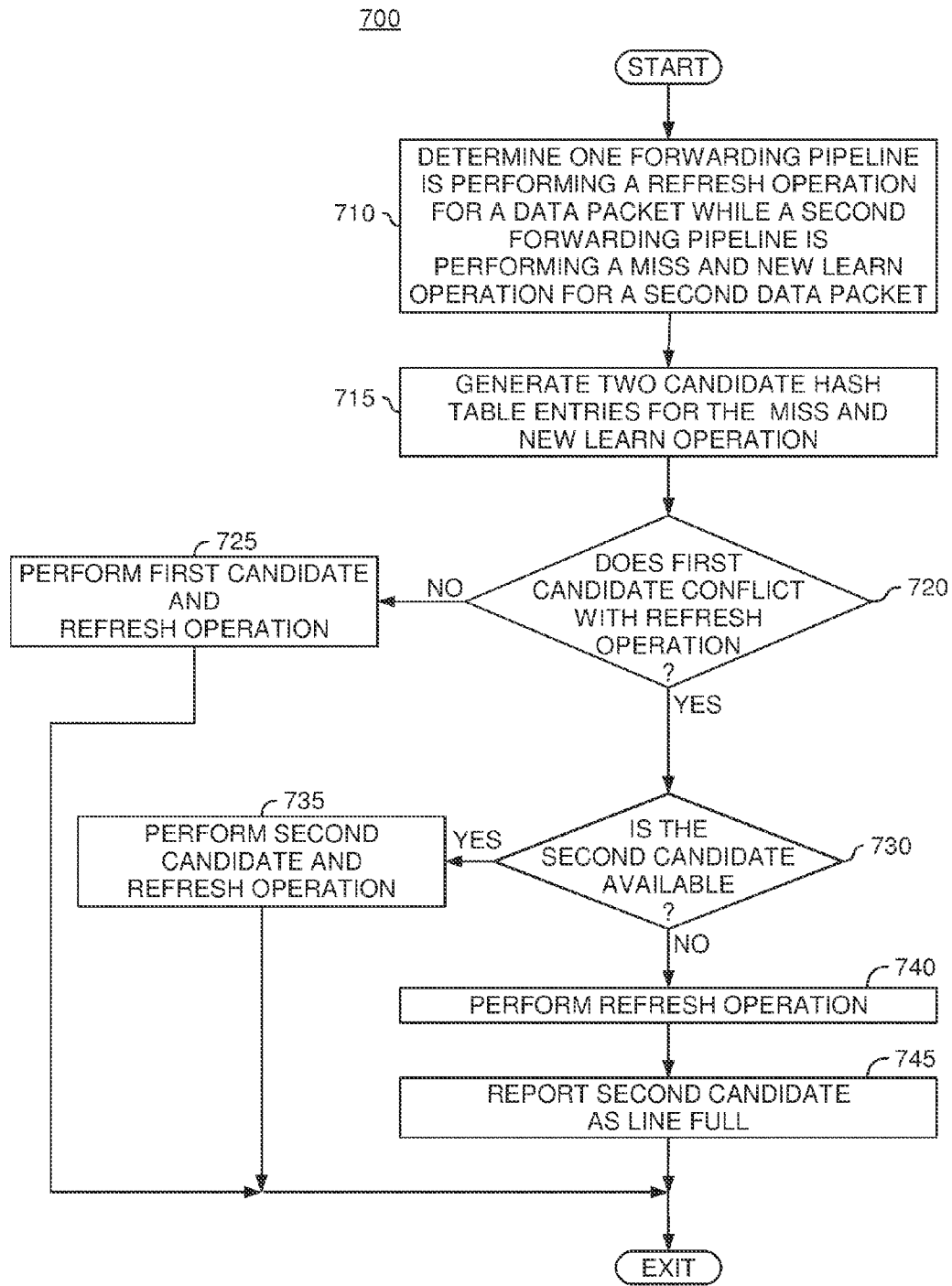
FIG. 7 is a flow diagram illustrating a method for synchronizing forwarding tables stored in 4×4 D-left hash table data structures across multiple forwarding pipelines, according to one embodiment described herein.

FIG. 7 is a flow diagram illustrating a method for synchronizing forwarding tables stored in 4×4 D-left hash table data structures across multiple forwarding pipelines, according to one embodiment described herein. As shown, the method 700 begins at block 710, where the MAC table management component 150 determines that one forwarding pipeline is performing a refresh operation for a data packet received on a port managed by the forwarding pipeline, while a second forwarding pipeline is performing a miss and new learn operation for another data packet received on a port managed by the second forwarding pipeline. In response, the MAC table management component 150 generates two candidate hash table entries for performing the miss and new learn operation (block 715). For example, the first and second candidates could be generated using the techniques described above.

As shown, the MAC table management component 150 determines whether the first candidate conflicts with the refresh operation (block 720). That is, the MAC table management component 150 could determine whether the first candidate operation and the refresh operation reference the same bank of the D-left hash table storing the MAC table data and, if so, could determine that the two operations conflict with one another. If the MAC table management component 150 determines there is no conflict, the MAC table management component 150 performs both the first candidate operation and the refresh operation (block 725), and the method 700 ends.

If instead the MAC table management component 150 determines a conflict does exist, the MAC table management component 150 then determines whether the second candidate operation is available (block 730). For instance, the MAC Table management component 150 could determine whether there are at least 2 free entries in the entire bucket (or line). For example, in a 4×4 d-left hashing setup, the MAC Table management component 150 could determine whether there are at least 2 free entries in the 4 tables corresponding to the bucket. If so, the MAC table management component 150 performs both the second candidate operation and the refresh operation (block 735), at which point the method 700 ends. In the event the MAC table management component 150 determines that the second candidate operation is not available because only one free entry exists within the bucket (or line), the MAC table management component 150 performs the refresh operation (block 740) and then reports the second candidate operations as a line full hash operation (block 745), at which point the method 700 ends. A line full hash operation generally indicates that the entry in question cannot be created because of a hash collision. Upon detecting such an event, the system (e.g., an ASIC) could notify software about the event and the key associated with the event. The software could then create an entry in a backup Ternary Content Addressable Memory (TCAM). In the event the software detects line full hash notifications are occurring at too great of a rate (e.g., more than a threshold rate), the software could perform operations to remove unused entries from the MAC table or could cause such operations to be performed more frequently.

Figure 8:
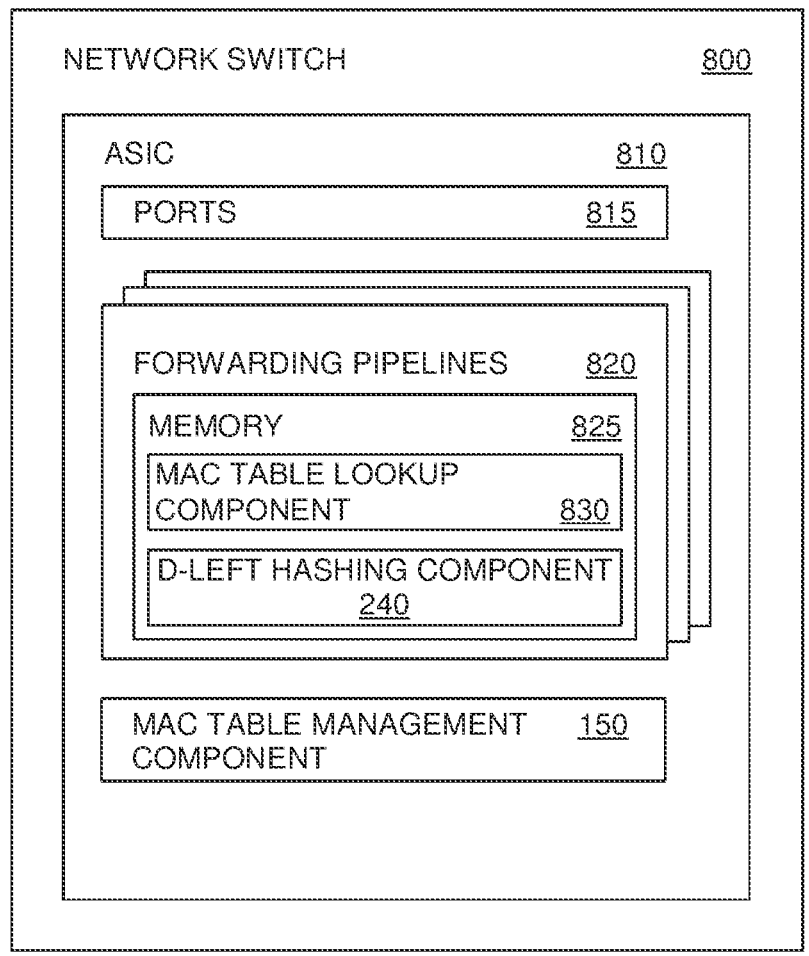
FIG. 8 is a block diagram illustrating a network switch configured with a MAC table management component, according to one embodiment described herein.

FIG. 8 is a block diagram illustrating a network switch configured with a MAC table management component, according to one embodiment described herein. The network switch 800 includes an ASIC 810, and the ASIC 810 includes a plurality of ports 815, a plurality of forwarding pipelines 820, and a MAC table management component 150. In one embodiment, the network switch 800 further contains one or more processors (not shown). The processor(s) may be any processing element capable of performing the functions described herein, and such a processor can represents single processor, multiple processors, a processor with multiple cores, and combinations thereof. Of course, the depicted example is for illustrative purposes only, and it is contemplated that certain embodiments may be implemented without such processors.

Each of the forwarding pipelines 820 includes a memory 820. The memory 820 may be either volatile or non-volatile memory and include, RAM, flash, cache, disk drives and the like. Although shown as a single entity, the memory 820 may be divided into different memory storage elements such as RAM and one or more hard disk drives. In one embodiment, the memory 820 comprises one or more static random access memory (SRAM) modules. Here, the memory 820 includes a MAC table lookup component 830 and a D-left hashing component 240. Generally, the MAC table lookup component 830 could access entries within a MAC table stored within the memory. In one embodiment, such a MAC table is stored as a D-left hash table and the MAC table lookup component 830 is configured to work in conjunction with the D-left hashing component 240 to perform update and look-up operations for the MAC table.

As discussed above, the MAC table management component 150 is configured to synchronize the MAC tables across the multiple forwarding pipelines 820 of the ASIC 810. For instance, the MAC table management component 150 could detect when a plurality of data packets on the ports 815, where each of the plurality of data packets is received on a respective port corresponds to a respective one of the plurality of forwarding pipelines 820. The MAC table management component 150 could then determine a plurality of update operations for the MAC tables on the plurality of forwarding pipelines 820, based on the received plurality of data packets. The MAC table management component 150 then performs the operation (or causes the operations to be performed) on each of the plurality of forwarding pipelines 820, so that the MAC tables across all of the forwarding pipelines 820 remain synchronized with one another.

As will be appreciated by one skilled in the art, embodiments may be embodied as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving, in a network switch circuit comprising a plurality of forwarding pipelines, a plurality of data packets, wherein each of the plurality of data packets corresponds to a respective one of the plurality of forwarding pipelines, and wherein each of the plurality of forwarding pipelines contains a respective forwarding table corresponding to a respective plurality of ports managed by the forwarding pipeline;
   based on the received plurality of data packets, determining a plurality of update operations to be performed on the forwarding tables; and
   performing the plurality of update operations on the forwarding tables for each of the plurality of forwarding pipelines, such that all the forwarding tables across all forwarding pipelines of the plurality of forwarding pipelines are synchronized, thereby enabling updated information relating to the received plurality of data packets to be used by all forwarding pipelines of the plurality of forwarding pipelines, wherein performing the plurality of update operations for each of the plurality of forwarding pipelines further comprises:
     determining that a first update operation and a second update operation of the plurality of update operations refer to a same memory bank of the forwarding tables, such that the first update operation and the second update operation are performed in serial and are not performed together in a single clock cycle;
     selecting the first update operation to be performed on a current clock cycle;
     performing the selected update operation on the current clock cycle; and
     writing the second update operation to a write cache for execution on a subsequent clock cycle.

2. The method of claim 1, further comprising:
   maintaining the forwarding tables on each of the plurality of forwarding pipelines as a 4×4 D-left hash data structure in a memory of the forwarding pipeline.

3. The method of claim 2, wherein the memory in a first one of the plurality of forwarding pipelines comprises a static random-access memory (SRAM) capable of performing a single read operation and a single write operation per clock cycle.

4. The method of claim 1, wherein the forwarding table on each of the plurality of forwarding pipelines contains a global data set corresponding to all of the plurality of forwarding pipelines.

5. The method of claim 4, wherein the forwarding tables on each of the plurality of forwarding pipelines are identical, wherein the forwarding tables provide a single logical routing table for all of the ports on the network switch.

6. The method of claim 1, wherein the first update operation and the second update operation comprise forwarding table refresh operations.

7. An integrated circuit, comprising:
   a plurality of ports;
   a plurality of forwarding pipelines, wherein each of the plurality of forwarding pipelines is configured to manage a respective subset of the plurality of ports, and wherein each of the plurality of forwarding pipelines contains a respective forwarding table corresponding to the respective subset of the plurality of ports managed by the forwarding pipeline; and
   logic circuit configured to:
     receive a plurality of data packets on ports in the plurality of ports;
     based on the received plurality of data packets, determine a plurality of update operations to be performed on the forwarding tables; and
     perform the plurality of update operations on the forwarding tables for each of the plurality of forwarding pipelines, such that all the forwarding tables across all forwarding pipelines of the plurality of forwarding pipelines are synchronized, thereby enabling updated information relating to the received plurality of data packets to be used by all forwarding pipelines of the plurality of forwarding pipelines, wherein the logic circuit is further configured to:
       determine that a first update operation and a second update operation of the plurality of update operations refer to a same memory bank of the forwarding tables, such that the first update operation and the second update operation are performed in serial and are not performed together in a single clock cycle;
       select the first update operation to be performed on a current clock cycle;
       perform the selected update operation on the current clock cycle; and
       write the second update operation to a write cache for execution on a subsequent clock cycle.

8. The integrated circuit of claim 7, wherein each of the plurality of forwarding pipelines further comprises a memory, and wherein each of the plurality of forwarding pipelines is configured to maintain the forwarding table as a 4×4 D-left hash data structure in a memory of the forwarding pipeline.

9. The integrated circuit of claim 8, wherein the memory in a first one of the plurality of forwarding pipelines comprises a static random-access memory (SRAM) capable of performing a single read operation and a single write operation per clock cycle.

10. The integrated circuit of claim 7, wherein the forwarding table on each of the plurality of forwarding pipelines contains a global data set corresponding to all of the plurality of forwarding pipelines.

11. The integrated circuit of claim 10, wherein the forwarding tables on each of the plurality of forwarding pipelines are identical, wherein the forwarding tables provide a single logical routing table for all of the ports on the network switch.

12. The integrated circuit of claim 7, wherein the first update operation and the second update operation comprise forwarding table refresh operations.

13. A network switch, comprising:
a plurality of ports;
a plurality of forwarding pipelines, wherein each of the plurality of forwarding pipelines is configured to manage a respective subset of the plurality of ports, and wherein each of the plurality of forwarding pipelines contains a respective forwarding table corresponding to the respective subset of the plurality of ports managed by the forwarding pipeline; and
logic circuit configured to:
receive a plurality of data packets on ports in the plurality of ports;
based on the received plurality of data packets, determine a plurality of update operations to be performed on the forwarding tables; and
perform the plurality of update operations on the forwarding tables for each of the plurality of forwarding pipelines, such that all the forwarding tables across all forwarding pipelines the plurality of forwarding pipelines are synchronized, thereby enabling updated information relating to the received plurality of data packets to be used by all forwarding pipelines of the plurality of forwarding pipelines, wherein the logic circuit is further configured to:
determine that a first update operation and a second update operation of the plurality of update operations refer to a same memory bank of the forwarding tables, such that the first update operation and the second update operation are performed in serial and are not performed together in a single clock cycle;
select the first update operation to be performed on a current clock cycle;
perform the selected update operation on the current clock cycle; and
write the second update operation to a write cache for execution on a subsequent clock cycle.

14. The network switch of claim 13, wherein the forwarding table on each of the plurality of forwarding pipelines contains a global data set corresponding to all of the plurality of forwarding pipelines.

15. The network switch of claim 14, wherein the forwarding tables on each of the plurality of forwarding pipelines are identical, wherein the forwarding tables provide a single logical routing table for all of the ports on the network switch.

16. The network switch of claim 13, wherein the logic is further configured to:
maintain the forwarding tables on each of the plurality of forwarding pipelines as a 4×4 D-left hash data structure in a memory of the forwarding pipeline, wherein the memory in a first one of the plurality of forwarding pipelines comprises a static random-access memory (SRAM) capable of performing a single read operation and a single write operation per clock cycle.

17. The network switch of claim 13, wherein the first update operation and the second update operation comprise forwarding table refresh operations.

* * * * *